United States Patent [19]

Rabjohns

[11] Patent Number: 5,748,941

[45] Date of Patent: May 5, 1998

[54] SYSTEM AND METHOD FOR SYNCHRONIZING CONTROL CLOCKS FOR A MODULAR PRINTING SYSTEM

[75] Inventor: Douglas T. Rabjohns, Fairport, N.Y.

[73] Assignee: Xerox Corporation, Stamford, Conn.

[21] Appl. No.: 556,153

[22] Filed: Nov. 9, 1995

[51] Int. Cl.⁶ .................................................. G06F 1/12
[52] U.S. Cl. ............................................................. 395/551
[58] Field of Search ............................................. 395/551

[56] References Cited

U.S. PATENT DOCUMENTS

| | | | |
|---|---|---|---|
| 4,894,846 | 1/1990 | Fine | 375/356 |
| 5,041,966 | 8/1991 | Nakai et al. | 395/553 |
| 5,392,421 | 2/1995 | Lennartsson | 395/551 |
| 5,402,424 | 3/1995 | Kou | 370/324 |
| 5,428,645 | 6/1995 | Dolev et al. | 375/354 |

Primary Examiner—Thomas M. Heckler
Attorney, Agent, or Firm—Michael J. Nickerson

[57] ABSTRACT

A printing system includes a feeder module having a local clock; a marking engine having a local clock; a finisher module having a local clock; and a control unit. The control unit is connected to the feeder module, marking engine, and the finisher module. The control unit sends a sync preparation signal to the feeder module, the marking engine, and the finisher module. The feeder module, marking engine, and the finisher module each send a signal to the control unit so that the control unit can determine a difference between the local time of the control unit and the local time of each of the feeder module, marking engine, and the finisher module. The control unit sends event instructions to each of said feeder module, said marking engine, and said finisher module and timing information in terms of the local time of each of the feeder module, marking engine, and finishing module.

15 Claims, 2 Drawing Sheets

*(Coventional Art)*

SYSTEM AND METHOD FOR SYNCHRONIZING CONTROL CLOCKS FOR A MODULAR PRINTING SYSTEM

FIELD OF THE PRESENT INVENTION

The present invention is directed to controlling the events of a modular printing system. More specifically, the present invention is directed to a system or method for synchronizing individual local clocks of functional modules in a modular printing system.

BACKGROUND OF THE PRESENT INVENTION

FIG. 1 illustrates the architecture of a conventional closed architecture printing system. In the conventional system, the printing system includes a plurality of N modular stations which work together to produce the printed document. As illustrated in FIG. 1, the conventional printing system includes station(1) 13, station(2) 15, and station(N) 17. In a typical printing system, the station(1) 13 may be a feeder which feeds the recording medium to station(2) 15. Station (2) 15 may be a marking engine which produces an image upon the recording medium. Lastly, station(N) 17 may be a finisher which either collates, staples, binds, or performs other such finishing functions upon the image bearing recording medium received from station(2) 15.

Each of these stations in the conventional closed printing system is controlled by a microprocessor 11. The microprocessor 11 provides control signals to the various stations so as to control when the various stations perform their assigned functions. The various stations are also connected to a central clock 19 which provides the clock signals to the station so that the various stations can perform their functions synchronously with each other.

Although the above-described system performs well in a closed architecture printing system, such a system cannot efficiently operate when the printing system is an open architecture or a modular architecture. Open or modular architecture printing systems enable the user to mix and match different modules within the printing system so as to create a printing system specific to the needs of the user.

As in the conventional closed architecture printing system, the functionality of the various modules in the modular or open architecture must be properly scheduled and synchronized so that the printing system operates effectively. In order to schedule and synchronize these modules, there is a need to know when an event will occur in each module. An absolute time reference for all the modules and the scheduler will enable proper scheduling and synchronization.

Unfortunately, each module may reside on a different platform, and therefore, use a different clock (local clock). Thus, the control of the printing system must be able to schedule and synchronize the functions of the various modules in an environment that does not have an absolute time reference and where the modules reside on different platforms and utilize different local clocks.

Event synchronization between discrete platforms requires a separate controller to schedule events between the platforms. For example, a feeder module and a marking engine need to be scheduled such that the feeder module delivers a sheet to the marking engine at an expected time so that the marking engine can register an image on the sheet. On a single platform system, as described with respect to FIG. 1, this scheduling of events is trivial. However, when the functions exist on discrete platforms with separate local clocks, the scheduling of the various events become problematic.

Once suggested solution to the problem of event synchronization between discrete platforms of a printing system is the use of soft signals and relative time offsets. More specifically, soft signals are utilized to generate sync signals and the relative time offsets are used by the modules in order to coordinate the events with reference to the generation of the sync signal.

For example, soft signals are software-generated sync signals which are fed to all of the modules or discrete platforms of the printing system. The relative time offsets are dynamic real time delays which are based upon the generation of a sync signal and a known physical distance between event positions which have been translated to a time point of reference. For example, a relative time offset may indicate to a feeder module to wait 20 milliseconds after the receipt of a feed sync signal before turning on the feed clutch.

A problem with utilizing such a relative synchronization method, is that the printing system must produce a sync signal before each operation, according to the relative time information, so that the various modules can coordinate the performing of their function relative to these signals. This requires the system to continually generate sync signals and does not allow for corrections to the relative time offsets should a module not be performing to standard.

Therefore, it is desirable to provide a modular printing system which utilizes absolute times instead of relative time offsets to synchronize the various events between platforms or modules so as to avoid generation of a plurality of sync signals and to add flexibility to scheduling when a module is not performing timely. The present invention proposes a system and method which utilizes a scheduler to schedule events to occur at absolute times corresponding to the local clocks of each module.

SUMMARY OF THE PRESENT INVENTION

One aspect of the present invention is a method for enabling synchronization of a master scheduler with a module having a local clock. This method determines a local time of a module and determines a difference between a local time of a master schedule and the local time of the module.

Another aspect of the present invention is a modular feeder/printer/finisher system. This system includes a first module having a local clock and master scheduler means for determining a local time of the first module and for determining a difference between the local time of the first module and a local time of the master scheduler means. The master scheduler means generates an event instruction and a timing instruction in terms of the local time of the local clock of the first module.

A third aspect of the present invention is a printing system. The printing system includes a feeder module having a local clock, a marking engine having a local clock, a finisher module having a local clock, and a control unit operatively connected to the feeder module, marking engine, and finisher module, having a local clock. The control unit sends a sync preparation signal to the feeder module, marking engine, and finisher module. The feeder module, marking engine, and finisher module each send information indicating a local time of the local clock thereof corresponding to a generation of a sync signal. The feeder module, marking engine, and finisher module each send a sync signal to the control unit. The control unit determines a difference between the local time of the control unit and the local time of each of the feeder module, marking engine, and finisher module. The control unit sends event instructions to each of the feeder module, marking engine, and finisher module and timing information in terms of the local time of each of the feeder module, marking engine, and finishing module.

Further objects and advantages of the present invention will become apparent from the following description of the various features of the present invention.

BRIEF DESCRIPTION OF THE DRAWINGS

The following is a brief description of the drawings used in describing the present invention, and thus, the drawings are presented for illustrative purposes only, and thus, should not be limitative to the scope of the present invention, wherein.

DETAILED DESCRIPTION OF THE PRESENT INVENTION

Figure 1:
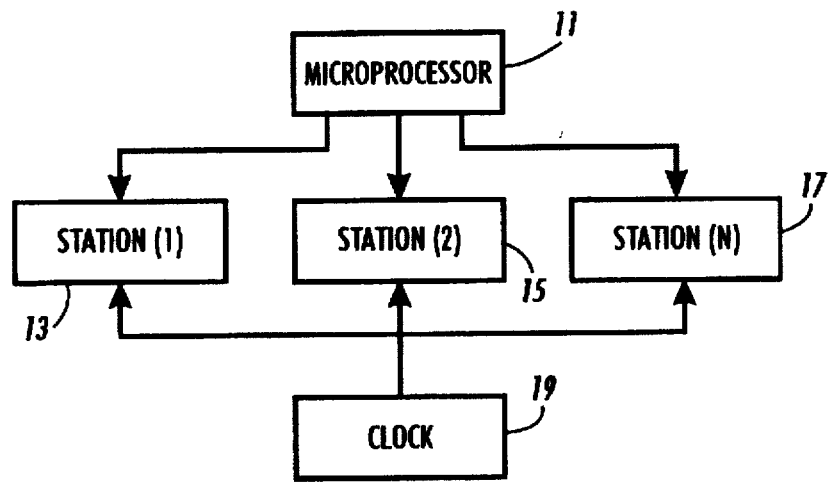
FIG. 1 is a block diagram illustrating the architecture of a conventional printing system.

For a general understanding of the present invention, reference is made to the drawings. In the drawings, and in the specification, like reference numerals have been used throughout the designate identical or equivalent elements or steps.

Figure 2:
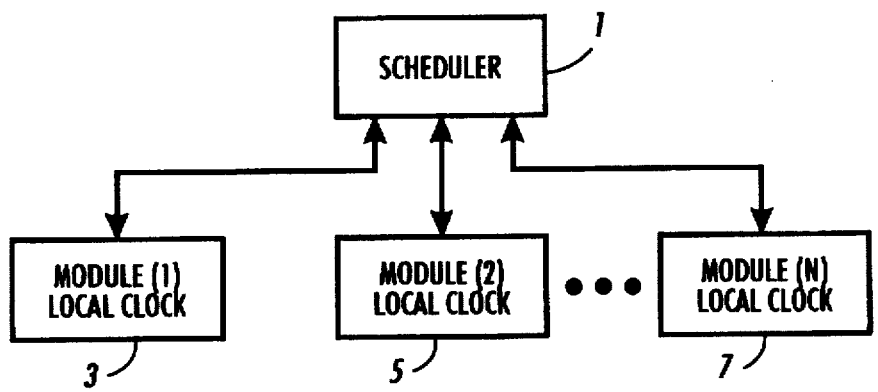
FIG. 2 is a block diagram illustrating the architecture of a printing system according to the concepts of the present invention.

FIG. 2 illustrates a modular or open architectural printing system according to the concepts of the present invention. In this embodiment, the printing system includes a scheduler 1 which is connected to a plurality of modules wherein each module has a local clock. For example, the scheduler 1 is connected to module(1) 3, module(2) 5 and module(N) 7; in the preferred embodiment of the present invention, FIG. 2 would illustrate that module (1) 3 is a feeder module, module (2) 5 is a marking engine, module (N) 7 is a finisher module, and the scheduler 1 is a control unit. Although FIG. 2 illustrates three separate modules connected to the scheduler, it is noted that the actual number of modules connected to the scheduler 1 is not critical such that any number of modules may be connected to the scheduler 1.

As noted above, each module contains a local clock which maintains the local time for that particular module. Moreover, the scheduler 1 also includes a clock which maintains the master time utilized in scheduling the various events in the printing system.

The scheduler 1 provides the control mechanism for the printing system so that the various modules act in synchronization to perform a respective function or complete their respective events in a precise manner such that the printing system operates effectively. To coordinate the scheduling of the various events or functions carried out by the plurality of interconnected modules, the scheduler 1 provides the timing information to the individual modules as well as the event instruction corresponding to that timing information so that the modules carry out their respective functions in a synchronized manner. The timing information provided by the scheduler 1 is provided to each of the individual modules in terms of the local time of a local clock associated with the module.

In other words, each module receives an event instruction from the scheduler 1 as well as timing information which indicates to the module the local time of that module at which the event should occur. The scheduler 1 of the present invention utilizes absolute times to synchronize the various events between the various modules or platforms instead of utilizing the relative time offsets of the conventional systems.

To provide the synchronization with absolute times, the scheduler 1 maintains a known clock offset for each of the local clocks in the various modules. The scheduler 1 then schedules events to occur at absolute times for each module wherein the terms of the absolute time are in terms of the local clock for the particular module. This known clock offset can also be updated periodically when the module is not performing its scheduled event or function in a timely fashion. The scheduler 1 determines the known clock offsets for each module by utilizing a synchronization process as illustrated in FIG. 3.

Figure 3:
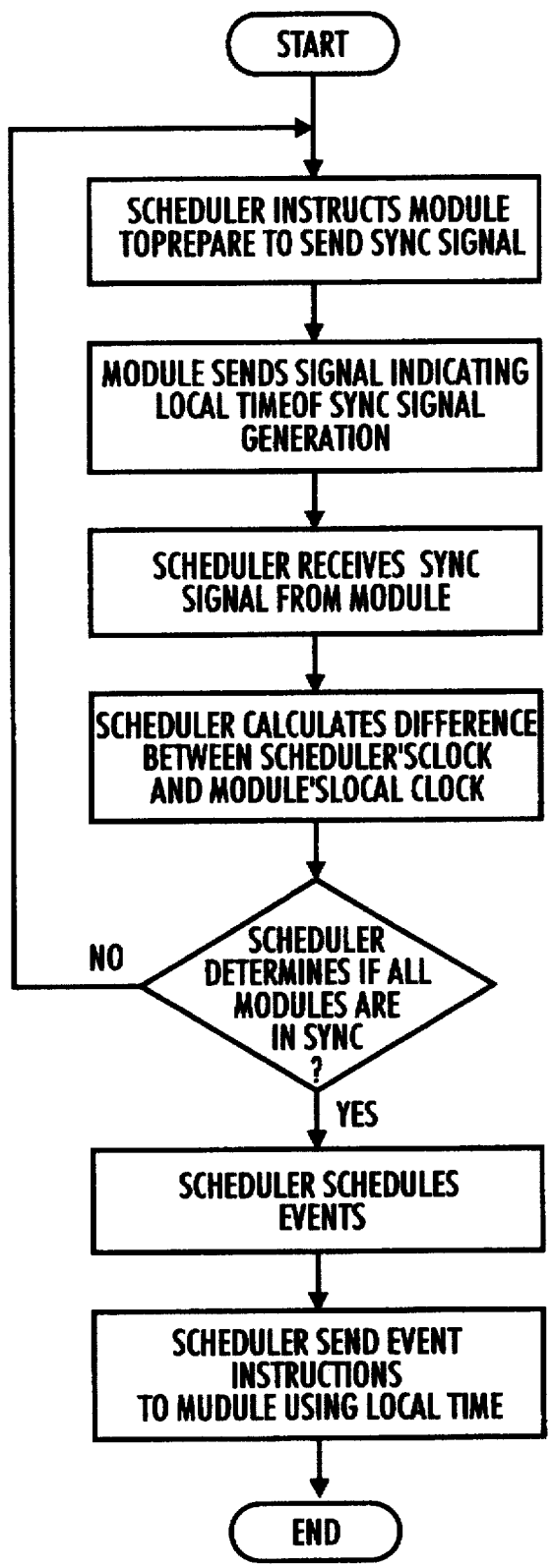
FIG. 3 is a flowchart illustrating the synchronization process according to the present invention.

FIG. 3 shows a preferred process of the present invention for synchronizing the various modules of the modular printing system so that the scheduler 1 can synchronize the events between the various platforms or modules utilizing absolute time. To synchronize the various modules, the scheduler 1 sends to each individual module a signal indicating to the module to prepare to send a sync signal back to the scheduler 1. Upon receiving this preparation signal from the scheduler 1, each module prepares to send a sync signal back to the scheduler 1. Also, the module sends a signal back to the scheduler indicating the local time of the local clock of the module at which the sync signal will be generated by the module. Thereafter, the module generates the sync signal when the local clock of the module corresponds to the local time that the module has sent to the scheduler with respect to the generation of the sync signal.

The sync signal generated by each of the modules is received by the scheduler 1 and the scheduler 1 notes the local time of the master clock so as to determine when the sync signal was received by the scheduler 1. The scheduler 1 then calculates the difference between the scheduler's clock time and the module's local clock time. This difference between the scheduler's clock time and the module's local clock time is maintained or stored by the scheduler 1 so that the scheduler 1 always knows the clock offset between the master clock of the schedule and the local clock of each module. This synchronization process is continued until all modules within the printing system are polled and synchronized with the scheduler 1.

After synchronizing all the modules with the scheduler 1, the scheduler 1 begins to schedule events for the printing process to be carried out. Once the various events are scheduled by the scheduler 1, the scheduler 1 sends event instructions to each individual modules and timing information corresponding to the event instructions. The timing information sent by the scheduler 1 to each individual module is in terms of the local time of the local clock situated in that particular module.

In another embodiment of the present invention, the scheduler 1 synchronize the events between the various platforms or modules utilizing soft sync signals instead of a hardwire sync line as described above. To synchronize the various modules, the scheduler 1 sends to each individual module a signal indicating to the module to prepare to send a signal back to the scheduler 1 indicating the time on the local clock of the module. Upon receiving this from the scheduler 1, each module sends a time signal (soft sync signal) back to the scheduler 1 indicating the local time of the local clock of the module at which the signal was generated by the module.

The time signal generated by each of the modules is received by the scheduler 1 and the scheduler 1 notes the local time of the master clock so as to determine when the time signal was received by the scheduler 1. The scheduler 1 then calculates the difference between the scheduler's clock time and the module's local clock time. This difference between the scheduler's clock time and the module's local clock time is maintained or stored by the scheduler 1 so that the scheduler 1 always knows the clock offset between the master clock of the schedule and the local clock of each module. This synchronization process is continued until all modules within the printing system are polled and synchronized with the scheduler 1.

This soft signal sync process can also enable the scheduler 1 to determine the speed in which the network is communicating messages between the various components. This delay, network speed, can be incorporated into the scheduler's 1 final scheduling process.

To more fully describe the synchronization process of the present invention, an example of a printing system utilizing a scheduler, feeder module, a marking engine, and a finisher module will be discussed below. In this example, the scheduler provides the control and scheduling functions of the printing system, the feeder module provides the feeding function of the recording medium to the marking engine, the marking engine provides the function of creating the desired image upon the recording medium, and the finisher module provides the finishing functions such as stapling, collating, binding, etc.

As discussed above, each of the modules and the scheduler has a local clock wherein the scheduler's local clock is utilized as the master clock for the printing system. Moreover, each of the modules has a sync line which is connected to the scheduler so as to provide the sync signal needed for synchronizing the various modules with the scheduler.

At some point prior to the printing system performing any printing operations, each of the individual modules are synchronized with the scheduler. As discussed with respect to FIG. 3, the scheduler sends a signal to a particular module indicating to the module to prepare to send a sync signal. In response to the signal from the scheduler, the particular module will send a signal back to the scheduler indicating the local time at which the module will generate the sync signal.

To synchronize the feeder, the scheduler sends a sync preparation signal to the feeder module, the feeder module will then send to the scheduler a signal indicating that the sync signal from the feeder module will be generated at some time, Fdc. After conveying this information to the scheduler, the module generates a sync signal when the time on its local clock corresponds to the time Fdc. Upon receiving the sync signal from the feeder module, the scheduler notes the time of the master clock Shc within the scheduler and calculates the difference (Shc–Fdc) between the time of the master clock and the time corresponding to the local clock of the feeder module. This difference is then maintained by the scheduler as Fdx or a clock offset for the feeder module.

To synchronize the marking engine module, the scheduler sends a sync preparation signal to the marking engine module, the marking engine module will then send to the scheduler a signal indicating that the sync signal from the marking engine module will be generated at some time, Mc. After conveying this information to the scheduler, the module generates a sync signal when the time on its local clock corresponds to the time Mc. Upon receiving the sync signal from the marking engine module, the scheduler notes the time of the master clock Shc within the scheduler and calculates the difference (Shc–Mc) between the time of the master clock and the time corresponding to the local clock of the marking engine module. This difference is then maintained by the scheduler as Mx or a clock offset for the marking engine module.

To synchronize the finisher, the scheduler sends a sync preparation signal to the finisher module, the finisher module will then send to the scheduler a signal indicating that the sync signal from the finisher module will be generated at some time, Fnc. After conveying this information to the scheduler, the module generates a sync signal when the time on its local clock corresponds to the time Fnc. Upon receiving the sync signal from the finisher module, the scheduler notes the time of the master clock Shc within the scheduler and calculates the difference (Shc–Fnc) between the time of the master clock and the time corresponding to the local clock of the finisher module. This difference is then maintained by the scheduler as Fnx or a clock offset for the finisher module.

After completing the synchronization of each of the various modules in the printing system, the scheduler now has a reference time for each of the base modules which can be used to schedule the performances of particular actions.

For example, the scheduler would begin the scheduling a simple feed/marking/finisher process, in terms of the master clock, at some time Sc. The remaining events for this simple process, in terms of the master clock would be the feeding event at Sc+100 wherein 100 corresponds to the relative time offset for the event, the marking process at Sc+300 wherein 300 corresponds to the relative time offset for the event, and the finishing process at Sc+600 wherein 600 corresponds to the relative time offset for the event.

The scheduler would then inform each module of the scheduled event and the timing information corresponding to the scheduled event in terms of the local clocks' times. More specifically, in the example discussed above, the scheduler would inform the feeder module that the feeding event would take place at Sc+100 (+/−) Fdx. Moreover, the scheduler would inform the marking engine to begin the marking event at Sc+300 (+/−) Mx. Lastly, the scheduler would inform the finisher module to perform the finishing function at Sc+600 (+/−) Fnx. Thus, each module would receive timing information based on its own local clock's time.

Although the present invention has been described for a printing system with three modules, it is applicable to a system with any number of modules. For example, the scheduler of the present invention may be utilized in conjunction with a single feeder in a manufacturing environment so as to test the capabilities of the feeder, or the scheduler of the present invention may be utilized in a system having 20 or more modules. The present invention may also be utilized in a system with three feeders, two marking engines and five finishers. The configuration is unimportant. In essence, the present invention is not limited to the number of modules connected to the scheduler.

Moreover, the present invention's applicability is not limited to printing systems, but may be used in any open architecture process which requires a central scheduler to control a multitude of modules having their own local clocks.

In recapitulation, the present invention provides an open architecture printing system wherein the scheduler for the printing system synchronizes the various modules of the printing system and schedules the events to be carried out by each of the modules in terms of the local clocks associated with each module. More specifically, the present invention controls the synchronization of events between various modules utilizing absolute times corresponding to the actual times of each local clock in the individual modules. This enables the present invention to realize greater flexibility in the interchangeability of the various modules when configuring a printing system.

While the invention has been described with reference to various embodiments disclosed above, it is not confined to the details set forth above, but is intended to cover such modifications or changes as may come within the scope of the attached claims.

What is claimed is:

1. A modular feeder finisher system, comprising:
   a first module having a local clock; and
   master scheduler means for determining a time of said local clock of said first module and for determining a difference between said time of said local clock of said first module and a time of a local clock of said master scheduler means;
   said master scheduler means generating an event instruction and a timing instruction in terms of said time of said local clock of said first module and sending the event instruction and timing instruction thereto.

2. The modular feeder finisher system as claimed in claim 1, wherein said master scheduler means sends a sync separate signal to said first module and receives a signal from said first module indicating the time of said local clock of said first module corresponding to said first module generating a sync signal; and
   said master scheduler means receiving the sync signal and calculating the difference therefrom.

3. The modular feeder finisher system as claimed in claim 2, wherein said first module is a feeder system.

4. The modular feeder finisher system as claimed in claim 1, further comprising:
   a second module having a local clock;
   said master scheduler means determining a time of said local clock of said second module and determining a difference between said time of said local clock of said second module and said time of the local clock of said master scheduler means;
   said master scheduler means generating an event instruction and a timing instruction in terms of said time of said local clock of said second module and sending the event instruction and timing instruction thereto.

5. The modular feeder finisher system as claimed in claim 4, wherein said master scheduler means sends a sync separate signal to said second module and receives a signal from said second module indicating the time of said local clock of said second module corresponding to said second module generating a sync signal; and
   said master scheduler means receiving the sync signal and calculating the difference therefrom.

6. The modular feeder finisher system as claimed in claim 5, wherein said second module is a marking engine.

7. The modular feeder finisher system as claimed in claim 1, further comprising:
   a third module having a local clock;
   said master scheduler means determining a time of said local clock of said third module and determining a difference between said time of said local clock of said third module and said time of the local clock of said master scheduler means;
   said master scheduler means generating an event instruction and a timing instruction in terms of said time of said local clock of said third module and sending the event instruction and timing instruction thereto.

8. The modular feeder finisher system as claimed in claim 7, wherein said master scheduler means sends a sync separate signal to said third module and receives a signal from said third module indicating the time of said local clock of said third module corresponding to said third module generating a sync signal; and
   said master scheduler means receiving the sync signal and calculating the difference therefrom.

9. The modular feeder finisher system as claimed in claim 8, wherein said third module is a finisher system.

10. A printing system, comprising:
    a feeder module having a local clock;
    a marking engine having a local clock;
    a finisher module having a local clock; and
    a control unit, operatively connected to said feeder module, said marking engine, and said finisher module, having a local clock;
    said control unit sending a sync preparation signal to said feeder module, said marking engine, and said finisher module;
    said feeder module, said marking engine, and said finisher module each sending a sync signal to said control unit;
    said control unit determining a difference between the time of said local clock of said control unit and the time of each local clock of said feeder module, said marking engine, and said finisher module;
    said control unit sending event instructions to each of said feeder module, said marking engine, and said finisher module and timing information to each of said modules in the time associated with each of the local clocks of each of the modules.

11. A method for enabling synchronization of a master scheduler having a local clock with a module having a local clock in a printing system, comprising the steps of:
    (a) determining a local time of the local clock of the module: and
    (b) determining a difference between a local time of the local clock of the master scheduler and the local time of the local clock of the module;
    said step (a) including the substeps of;
       (a1) the master scheduler sending a sync preparation signal to the module, and
       (a2) the master scheduler receiving a signal from the module indicating the time of the local clock of the module.

12. The method as claimed in claim 11, further comprising the step of:
    (c) the master scheduler generating an event instruction and a timing instruction in terms of the time of the local clock of the module.

13. The method as claimed in claim 11, further comprising the step of:
    (c) the master scheduler generating an event instruction and a timing instruction in terms of the time of the local clock of the module.

14. The method as claimed in claim 11, wherein said substep (a2) includes the substeps of:
- (a2i) the master scheduler receiving a signal from the module indicating the time of the local clock the module corresponding to when the module will generate a sync signal; and
- (a2ii) the master scheduler receiving the sync signal.

15. The method as claimed in claim 14, further comprising the step of:
- (c) the master scheduler generating an event instruction and a timing instruction in terms of the time of the local clock of the module.

* * * * *